Nov. 25, 1958    M. LEDER ET AL    2,861,506
MEANS FOR AUTOMATICALLY ADJUSTING AN OBJECTIVE DIAPHRAGM
Filed Jan. 13, 1955    2 Sheets-Sheet 1

MARTIN LEDER
RUDOLF HAUPT
INVENTORS.

BY Karl F. Ross
AGENT

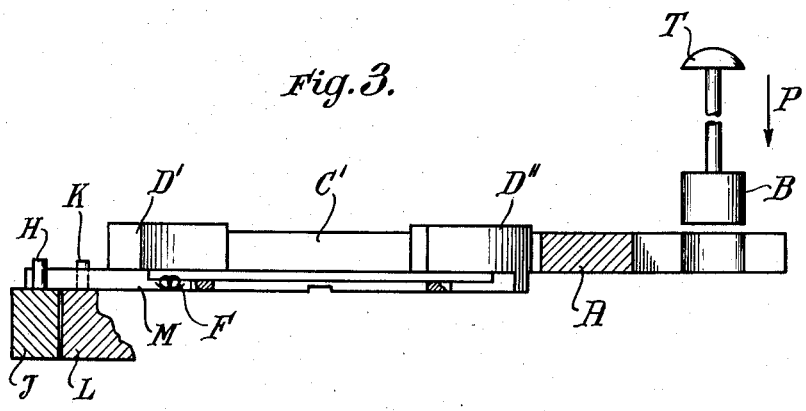
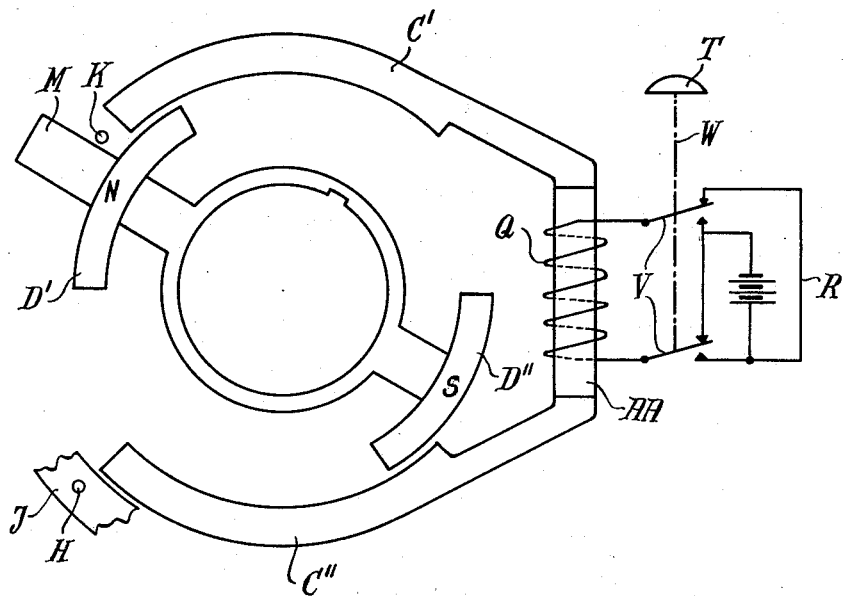

2,861,506

MEANS FOR AUTOMATICALLY ADJUSTING AN OBJECTIVE DIAPHRAGM

Martin Leder and Rudolf Haupt, Gottingen-Weende, Germany, assignors to ISCO Optische Werke G. m. b. H., Gottingen-Weende, Germany Application January 13, 1955, Serial No. 481,612

Claims priority, application Germany January 21, 1954

2 Claims. (Cl. 95—64)

The present invention relates to a method of and means for automatically adjusting the diaphragm of a photographic objective, more particularly the diaphragm of a so-called "one-eye" camera (e. g. of the reflex type) wherein a single objective serves the dual purpose of view-finding and picture-taking.

Various devices have already been proposed to facilitate the preselecting of a diaphragm opening to which the diaphragm is automatically adjusted during picture-taking (usually under the control of the shutter release button or its equivalent) after having previously been held in wide-open position during use of the view finder. Generally, these known devices incorporate mechanical actuators and linkages which usually are of complex design and encumber the objective assembly.

The general object of this invention is to provide a method of and means for effecting the desired adjustment of the diaphragm in a simpler manner than has been possible with known systems.

According to this invention, the diaphragm is adjusted from wide-open to preselected position (and/or vice versa) by means of a magnetic force controlled by the shutter-release mechanism. This force may be supplied, for example, by the field of a permanent magnet whose intensity is controlled by selectively completing a path for the lines of force with the aid of a mechanically movable member of high permeability. A restoring force opposing the aforementioned magnetic force may be derived from a spring or may also be magnetic in character. Again, an electromagnet may be substituted for the permanent magnet referred to.

The invention will be more fully described with reference to the accompanying drawing in which:

Fig. 3 is a view similar to Fig. 1 but illustrating a modification of the objective shown therein; and Fig. 4 is a view similar to Fig. 2 but illustrating a further modification.

Figure 1:
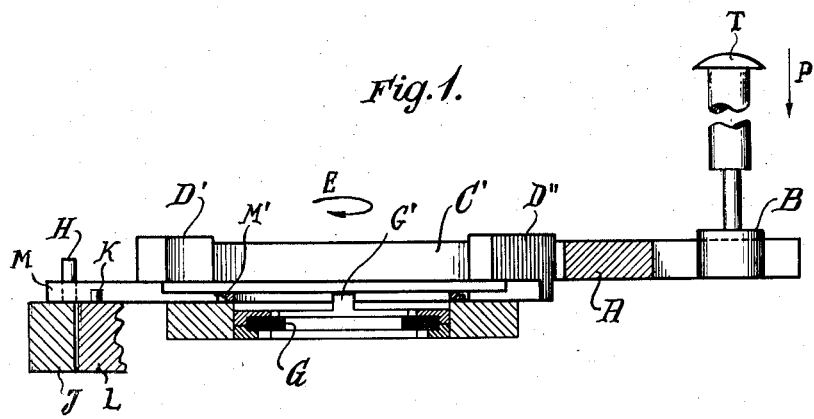
Fig. 1 is a sectional view of an objective embodying the invention, taken approximately on the line I—I of Fig. 2.
Figure 2:
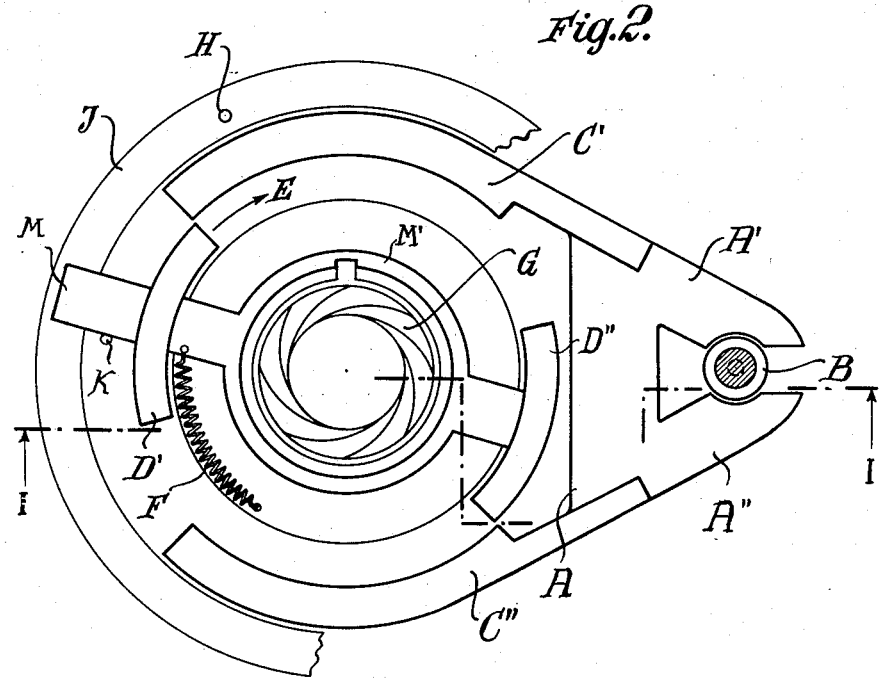
Fig. 2 is a plan view of the objective.

Referring first to Figs. 1 and 2, there is shown at A a permanent magnet whose poles A', A" are normally short-circuited for the magnetic flux by a paramagnetic member B, e. g. an iron plunger, controlled by the shutter-trip button T. A pair of soft-iron shoes C', C" form a shunt path for the flux which exerts a torque, in clockwise direction as viewed in Fig. 2 (arrow E), upon an armature M having a pair of arcuate pole pieces D', D" concentric with the arcuate extremities of shoes C', C". Normally, i. e. when the short-circuiting member B is in its effective position shown in Figs. 1 and 2, this torque is insufficient to rotate the armature M which is held against a fixed stop K on support L by a spring F.

An iris diaphragm G is provided with a control lug G' which engages a notch in an annular portion M' of armature M. A setting ring J, rotatable with respect to support L, carries a movable stop H which when engaged by the armature M defines a preselected opening for the iris diaphragm G. Engagement of armature M with fixed stop K keeps the diaphragm G in wide-open position suitable for view-finding purposes. It will be understood that the ring J is held against undesired displacement by friction or by suitable indexing means (not shown).

When the trip button T is depressed as indicated by arrow P, the reluctance of the path across poles A', A" is greatly increased by the removal of the paramagnetic plunger B, hence the coercive force across pole shoes C', C" is suddenly strengthened enough to overcome the restoring force of spring F and to rotate the armature M into contact with preset stop H, thereby closing the diaphragm G to a desired extent at the instant of picture-taking. When the button T is released, plunger B becomes effective again to weaken the shunt field across pole shoes C', C" and to enable spring F to return armature M to the position illustrated, thereby restoring the diaphragm to wide-open position.

It is possible to reverse the roles of the spring F and the magnet A by interchanging the positions of fixed stop K and movable stop H relative to armature M. This has been illustrated in Fig. 3 where the magnetic force urges the armature M into contact with the fixed pin K on support L, plunger B being normally withrawn from magnet A; when the trip button T is depressed as indicated by arrow P, plunger B again completes an alternative path for the magnetic flux and weakens the field acting upon armature M, thereby enabling spring F to rotate this armature into contact with movable pin H on setting ring J. In Fig. 3, of course, the diaphragm (not shown) is wide open when the armature M is pressed against stop K under the control of the magnetic force.

The magnetic energization of pole shoes C', C" may also be effected electrically, under the control of trip button T, against the force of a restoring spring F arranged as shown either in Fig. 2 or in Fig. 3. This spring, however, may be dispensed with in a four-pole arrangement, e. g. as shown in Fig. 4, in which the restoring force is provided by a reversal of the polarity of the control magnet. In Fig. 4, it will be noted, the permanent magnet A has been replaced by an electromagnet AA energized by a coil Q connected, via a reversing switch V, to a source of direct current R. Switch V is controlled by trip button T as illustrated schematically at W.

The armature M in Fig. 4 has been permanently magnetized so that its pole pieces D', D" exhibit distinct polarities N (north) and S (south). Depending, therefore, on the position of switch V, these pole pieces will be attracted either into the "wide-open" position illustrated, in which armature M is held against fixed stop K, or into a preselected position in which the armature engages the adjustable stop H on ring J. The operation of the system of Fig. 4 is, therefore, analogous to that of the embodiments previously described.

It will be apparent from the foregoing that the invention is capable of realization in a number of different ways and is not limited to the specific arrangements disclosed therein except insofar as such restriction is explicit in the appended claims. Thus, the armature M need not be a passive ferrous bar, as shown, but may also assume any other form well known in the art, such as that of an electromagnetic coil as used, for example, in power meters and the like.

What is claimed is:

1. In a photographic camera, in combination, an adjustable diaphragm, a control element for said diaphragm, fixed stop means co-operating with said control element and defining a normal position for said diaphragm, adjustable stop means cooperating with said control element and defining a preselected off-normal position for said diaphragm, a magnet, said control element including an armature mounted adjacent said magnet and adapted to be attracted thereby into a position of contact between said control element and one of said stop means, return means for exerting upon said control element a restoring force urging said control element into contact with the other of said stop means, an actuating member displaceable between a first and a second position, and operating means controlled by said actuating member for varying the effective field strength of said magnet to a degree sufficient to make its attracting force alternately superior and inferior to said restoring force, thereby maintaining said control element in contact with said one and said other stop means in said first and second position, respectively, of said actuating member.

2. In a photographic camera, in combination, an adjustable diaphragm, a control element for said diaphragm, fixed stop means co-operating with said control element and defining a normal position for said diaphragm, adjustable stop means cooperating with said control element and defining a preselected off-normal position for said diaphragm, a permanent magnet provided with pole pieces forming a first and a second air gap, said control element including an armature movably mounted at said first air gap for attraction by said magnet into a position of contact between said control element and one of said stop means, spring means operatively connected with said control element and exerting upon it a restoring force urging said control element into contact with the other of said stop means, an actuating member displaceable between a first and a second position, and a paramagnetic shunt element movable by said actuating member away from and toward said second gap for varying the effective field strength of said magnet across said first gap to a degree sufficient to make its attracting force alternately superior and inferior to said restoring force, thereby maintaining said control element in contact with said one and said other stop means in said first and said second position, respectively, of said actuating member.

References Cited in the file of this patent

UNITED STATES PATENTS

| | | |
|---|---|---|
| 226,485 | Bunnell | Apr. 13, 1880 |
| 900,344 | Bartels | Oct. 6, 1908 |
| 1,194,700 | Besaw et al. | Aug. 15, 1916 |
| 1,934,484 | Camilli | Nov. 7, 1933 |
| 2,206,086 | Galyon | July 2, 1940 |
| 2,777,371 | Schutz | Jan. 15, 1957 |

FOREIGN PATENTS

| | | |
|---|---|---|
| 108,458 | Great Britain | Jan. 17, 1918 |
| 237,269 | Switzerland | Mar. 30, 1942 |